(12) United States Patent
Endo et al.

(10) Patent No.: US 6,181,189 B1
(45) Date of Patent: Jan. 30, 2001

(54) INTERFACE CIRCUIT SWITCHING BETWEEN A SOURCE-INPUT MODE AND A SINK-INPUT MODE

(75) Inventors: Tamotsu Endo, Mie-ken; Youichi Goushi, Aichi-ken, both of (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/199,792

(22) Filed: Nov. 25, 1998

(30) Foreign Application Priority Data

Nov. 26, 1997 (JP) .................................................. 9-324370

(51) Int. Cl.$^7$ ........................................................ H03L 5/00
(52) U.S. Cl. .................................. 327/333; 326/38; 326/63
(58) Field of Search ................................... 327/333, 306; 326/62, 63, 38, 37

(56) References Cited

U.S. PATENT DOCUMENTS

| | | | |
|---|---|---|---|
| 4,763,023 | * 8/1988 | Spence | 307/480 |
| 5,117,123 | * 5/1992 | Sendelweck | 307/239 |
| 5,257,223 | * 10/1993 | Dervisoglu | 365/154 |
| 5,583,452 | * 12/1996 | Duong et al. | 326/49 |

* cited by examiner

Primary Examiner—Jung Ho Kim
(74) Attorney, Agent, or Firm—Oblon, Spivak, McClelland, Maier & Neustadt, P.C.

(57) ABSTRACT

The interface circuit of the present invention is composed to provide:

changeover switch 24 that switches between a connection state in which pull-up resistor 23 is connected to input terminal 22 and a connection state in which pull-down resistor 23 is so connected; and microcomputer 26 that discriminates whether it is sink input or source input by discriminating the switch connection state of this changeover switch 24. Moreover, the interface circuit is composed to switch between a signal output state that outputs a signal that is an inversion of the input signal and a signal output state that outputs the input signal as it stands, based on the above discrimination result by this microcomputer 26.

11 Claims, 7 Drawing Sheets

INTERFACE CIRCUIT SWITCHING BETWEEN A SOURCE-INPUT MODE AND A SINK-INPUT MODE

BACKGROUND OF THE INVENTION

1. Field of the Invention

The present invention relates to interface circuits provided with functions for dealing with contact inputs and input signals such as logic.

2. Description of the Related Art

There are two methods for inputting input signals to the terminals of control devices composed of microcomputers; these are sink input and source input. In Japan, control devices are mostly of sink input type but overseas, and particularly in Europe, the majority are of source input type. Therefore, makers who produce this type of control equipment have been producing respective control devices for sink input and control devices for source input, and shipping them according to the users' demands. As against this, the makers have recently been trying to reduce the number of types of production machine. For this reason they have been trying to produce control devices composed to be capable of using either of the above two input methods (shared use).

An example of a control device of a composition capable of shared use of the above two input methods is shown in FIG. 1. This FIG. 1 is an electrical circuit diagram showing the input circuit part of the control device. As shown in FIG. 1, four diodes 2, 3, 4 and 5, resistor 6 and photodiode 7a of photocoupler 7 are connected to input terminal 1. Photodetector 7b of photocoupler 7 is connected between a, for example, 5V DC voltage terminal Vp5 and earth. Moreover, the junction point between photodectector 7b and DC voltage terminal Vp5 is connected to input terminal 8a of microcomputer 8.

Contacts 10a and 10b, which may be closed by jumper line 9, are provided between the anode of diode 2 of diodes 2, 3, 4, 5 and a, for example, 24V DC voltage terminal Vp. Also, contacts 12a and 12b, which may be closed by jumper line 11, are provided between the cathode of diode 5 of diodes 2, 3, 4, 5 and earth.

In the above composition, in the case of allowing sink input to be inputted at input terminal 1, contacts 10a and 10b are closed by soldering jumper line 9 between them, and contacts SA for sink input are connected between input terminal 1 and common earth terminal 13. On the other hand, in the case of allowing source input to be inputted at terminal 1, contacts 12a and 12b are closed by soldering jumper line 11 between them, and contacts SB for source input are connected between a, for example, 24V DC input terminal Vi and input terminal 1. By this means the above input circuit has a shared use composition for the two input methods.

However, with the above prior art composition, four diodes 2~5 and photocoupler 7 must be added for one input terminal 1. This has the disadvantage of increasing production costs. In particular, many control devices are normally provided with about 10~100 input terminals. In such cases there was a risk that as many circuit compositions made up of diodes 2~5 and photocouplers 7 as there were input terminals would have to be provided, and the production costs would increase considerably.

SUMMARY OF THE INVENTION

Accordingly, one object of the present invention is to provide an interface circuit that, while having a composition able to cope with either sink input or source input, may reduce production costs.

To achieve the above object, in a circuit provided with an input terminal that deals with contact inputs and input signals such as logic, the interface circuit of the present invention provides a means of switching that switches between a state in which a pull-up resistor is connected to the above-mentioned input terminal and a state in which a pull-down resistor is connected;

a means of discrimination that discriminates whether there is sink input or source input by discriminating the switch connection state of this means of switching; and a means of signal switching that switches between a signal output state that outputs an inverted signal of the above-mentioned input signal and a signal output state that outputs the said input signal as it stands, based on the discrimination result of this means of discrimination.

In the above composition, in the case of allowing sink input at the input terminal, the connection state in which the pull-up resistor is connected to the input terminal is produced by the means of switching. On the other hand, in the case of allowing source input at the input terminal, the connection state in which the pull-down resistor is connected to the input terminal is produced by the means of switching. Also, in the case of this composition, discrimination whether it is sink input or source input is performed by the above means of discrimination by discriminating the switch connection state of the above switching means. At the same time, the signal output state is switched by the means of signal switching between a signal output state that outputs an inverted signal of the input signal and a signal output state that outputs the input signal as it stands, based on the above discrimination result.

By this means, this becomes a composition that may deal with either sink input or source input. Moreover, the means of switching may be achieved by a low-cost composition such as a changeover switch. Also, the means of discrimination may be achieved by a low-cost composition such as a circuit that detects whether the voltage level of the terminal is high level or low level. Furthermore, the means of signal switching, too, may be achieved by such as a simple hardware circuit made up of a logic circuit and a changeover switch, or a microcomputer control function (software). Thus, overall production costs may be reduced.

Also, in the case of the above composition, a voltage detection circuit is provided that detects the voltage of the levels corresponding to the switch connection states of the above-mentioned means of switching. It is desirable that the above-mentioned means of discrimination should be so composed that it discriminates the switch connection state of the switching circuit, based on the voltage detected by the above-mentioned voltage detection circuit. Moreover, the means of switching may be composed by a manually-operated switch. Furthermore, it is desirable that the means of switching should be composed from a terminal block having a plural of pin terminals and connectors fitted on the pin terminals that short between specified pin terminals. Also, the above-mentioned means of switching may be composed from a plural of lands provided on a printed circuit board and jumper lines that are soldered to these lands and short between specified lands.

On the other hand, an even more desirable composition is to compose the above-mentioned means of switching from switching elements made up of relays or transistors and a means of switching control that exercises switching control of the above-mentioned switching elements based on external commands. Also, a desirable composition is one composed to provide a means of output switching that switches between an output method that outputs output signals by sink output and an output method that outputs signals by source output, based on the discrimination result of the above-mentioned means of discrimination.

Moreover, the device may be composed to provide a means of storage that stores the discrimination result discriminated by the above-mentioned means of discrimination at the previous time of operation, and a means of comparison that compares the discrimination result stored by this means of storage and the discrimination result discriminated by the above-mentioned means of discrimination at the current time of operation. In the case of this composition, an even more desirable composition is to provide a means of information that informs of the difference when the discrimination result by the means of discrimination at the previous time of operation and the discrimination result at the current time of operation are judged to differ.

Also, in the case of the above composition, it is also a good composition to provide a means of self-diagnosis that performs self-diagnosis of the operation of the interface circuit by making and breaking the above-mentioned switching elements in a state in which the above-mentioned input terminal is open and, at the same time judging whether the signals supplied from the above-mentioned switching elements are inverted or not.

Moreover, in a circuit provided with an input terminal that deals with contact inputs and input signals such as logic, another interface circuit of the present invention provides

- a switching circuit that switches between a connection state in which a pull-up resistor is connected to the above-mentioned input terminal and a connection state in which a pull-down resistor is connected;
- a voltage detection circuit that detects the voltage of the level corresponding to the switch connection state of this switching circuit;
- a discrimination circuit that discriminates whether it is sink input or source input by discriminating the switch connection state of the above-mentioned switching circuit, based on the voltage detected by this detection circuit; and
- a signal switching circuit that switches between a signal output state that outputs a signal that is an inverted signal of the above-mentioned input signal and a signal output state that outputs the said input signal as it stands, based on the discrimination result of this discrimination circuit.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
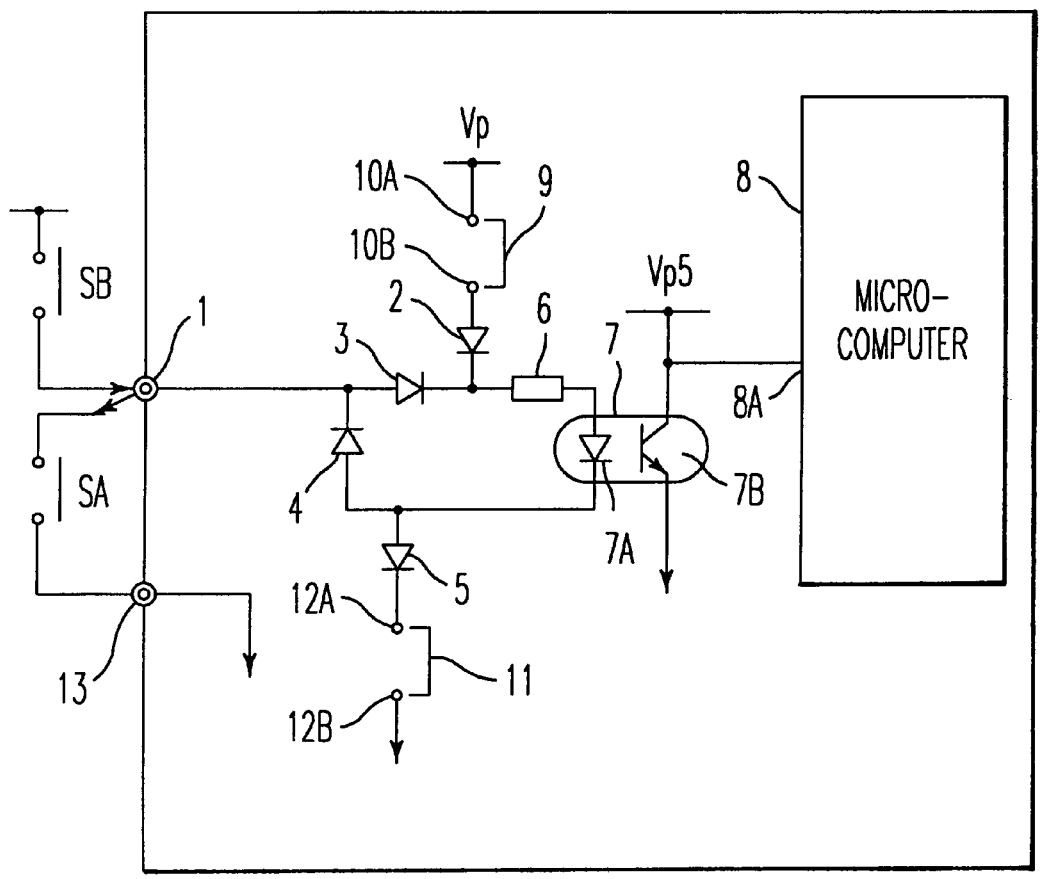
FIG. 1 is a drawing showing the composition of a prior art interface circuit.

Referring now to the drawings, wherein like reference numerals designate identical or corresponding parts throughout the several views, and more particularly to FIG. 2 thereof, one embodiment of the present invention will be described.

Figure 2:
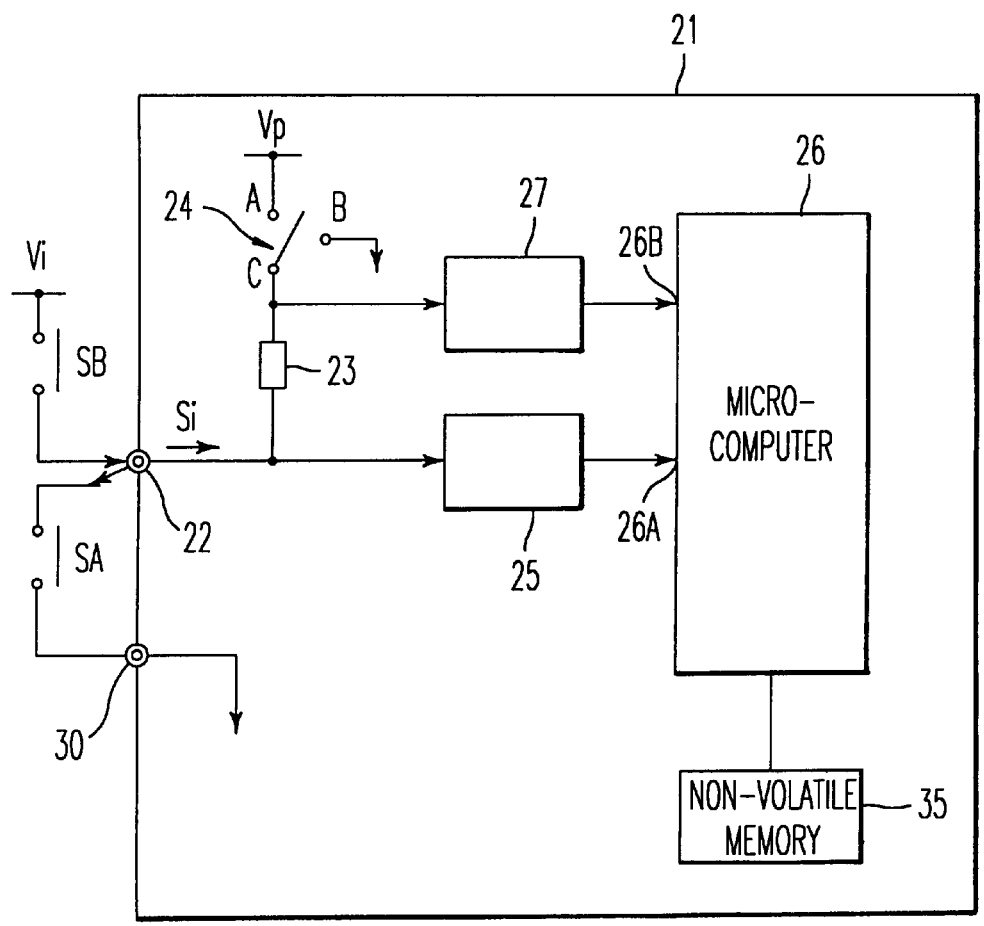
FIG. 2 is an electrical circuit diagram of an input circuit and its environs showing a first embodiment of the present invention.

Firstly, FIG. 2 is an electrical circuit diagram showing the input circuit and environs of control device 21. As shown in FIG. 2, input terminal 22 is connected to common contact c of changeover switch 24 via resistor 23 for pull-up or pull-down use, while at the same time, it is connected to input terminal 26a of microcomputer 26 via voltage level conversion circuit 25.

One contact a of the above changeover switch 24 is connected to, for example, 24V DC voltage terminal Vp, while the other contact b is connected to earth (0V). This changeover switch 24 composes the means of switching of the present invention. In this embodiment it is composed by a manually-operated switch (such as, for example, a dip-switch). Also, common contact c of changeover switch 24 is connected to input terminal 26b of microcomputer 26 via voltage level conversion circuit 27.

Figure 3:
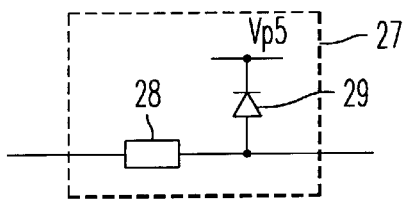
FIG. 3 is an electrical circuit diagram of a voltage level conversion circuit.

In this case, voltage level conversion circuit 27 is a circuit that converts the voltage level of common contact c of changeover switch 24 to a voltage level capable of input by microcomputer 26. In practice, when contacts (c–a) of changeover switch 24 have been made, it is a circuit that converts the 24V voltage impressed on common contact C to a voltage of, for example, 5V. As shown in FIG. 3, the above voltage level conversion circuit 27 is composed of, for example, resistor 28 and diode 29. The cathode of diode 29 is connected to 5V DC voltage terminal Vp5. Also, the anode of diode 29 (the terminal to the right of resistor 28 in FIG. 3) is connected to input terminal 26b of microcomputer 26.

Also, microcomputer 26 is composed to be capable of discriminating the switch connection state of changeover switch 24 by detecting the voltage level of common contact c of changeover switch 24. In practice, microcomputer 26 is composed to discriminate that contacts (c–a) of changeover switch 24 have been made when the voltage inputted at input terminal 26b is 5V, and to discriminate that contacts (c–b) of changeover switch 24 have been made when the voltage inputted at terminal 26b is 0V. In this case, microcomputer 26 has the function of the means of discrimination of the present invention.

Also, if changeover switch 24 is manually operated so that contacts (c–a) of changeover switch 24 become made, resistor 23 becomes in the connection state of being connected to input terminal 22 as a pull-up resistor, and input by the sink input method becomes possible for input terminal 22. Here, as shown by the broken line in FIG. 2. contacts SA for sink input are connected between input terminal 22 and common earth terminal 30. Input signal Si inputted at input terminal 22 becomes the signal shown in FIG. 5(a) when contacts SA are made and broken.

On the other hand, if changeover switch 24 is manually operated so that contacts (c–b) of changeover switch 24 become made, resistor 23 becomes in the connection state of being connected to input terminal 22 as a pull-down resistor, and input by the source input method becomes possible at input terminal 22. Here, as shown by the broken lines in FIG. 2, contacts SB for source input are connected between, for example, 24V DC voltage terminal Vi and input terminal 22. Input signal Si inputted at input terminal 22 becomes the signal shown in FIG. 5(b) when contacts SB are made and broken. Here it may be seen that input signal Si for source input has become the inverted signal of input signal Si for sink input (see FIG. 5(a)).

Figure 4:
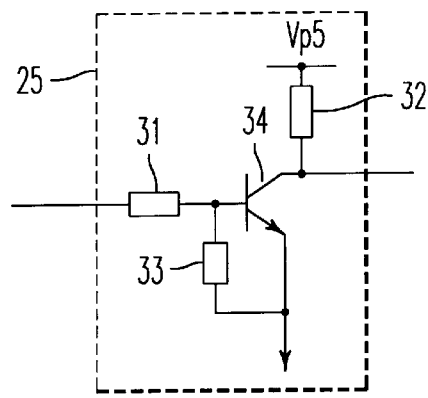
FIG. 4 is an electrical circuit diagram of a voltage level conversion circuit.

Voltage level conversion circuit 25 is a circuit that converts the voltage level of input signal Si inputted at input terminal 22 to a voltage level capable of being inputted by microcomputer 26. In practice, it is a circuit that converts the 24V voltage Vi impressed on input terminal 22 to a voltage of, for example, 5V when input signal Si is high level. As shown in FIG. 4, voltage level conversion circuit 25 is composed from resistors 31, 32 and 33 and NPN type transistor 34. Resistor 32, which is connected to the collector of transistor 34, is connected to 5V DC voltage terminal Vp5. Also, the collector of transistor 34 is connected to input terminal 26a of microcomputer 26.

Here, microcomputer 26 is composed to use, as an input signal applied to input terminal 26a, either an inverted input signal (that is to say, input signal Si), or a signal as it was outputted, as logic signal Sa in signal processing within microcomputer 26, depending on the switch connection state of changeover switch 24 discriminated in the above-mentioned manner. In practice, microcomputer 26 is composed as follows. It will take the inverted signal of the input signal applied to input terminal 26a (that is to say, input signal Si) as logic signal Sa when it is discriminated that contacts (c–a) of changeover switch 24 have been made. On the other hand, it will take the input signal applied to input terminal 26a (that is to say, input signal Si) in the signal state in which it was outputted as logic signal Sa when it is discriminated that contacts (c–b) of changeover switch 24 have been made.

Figure 5:
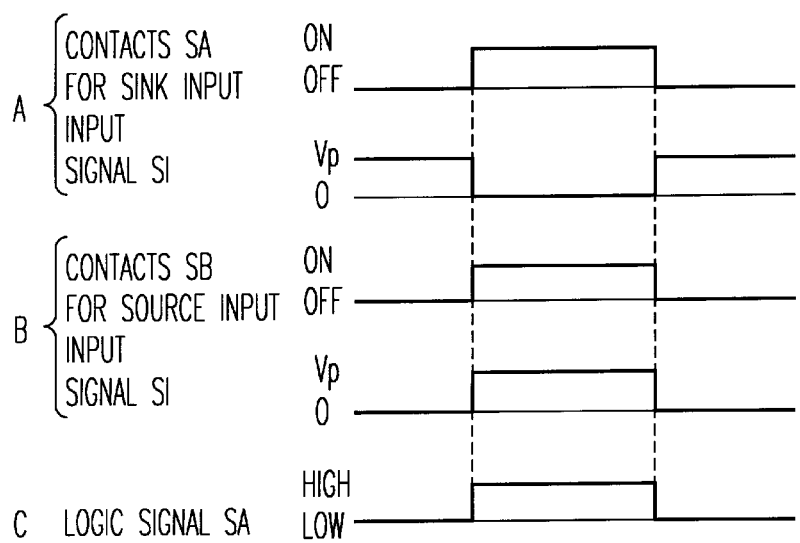
FIG. 5 is a time chart.

By this means, logic signal Sa, used as the input signal within microcomputer 26, becomes a signal such as shown in FIG. 5(c), and it becomes the same signal whether the signal inputted at input terminal 22 be sink input or source input. That is to say, the above input circuit is of a composition to enable shared use in a 2-input method. In this case, microcomputer 26 functions as the means of signal switching of the present invention.

Also, for example, non-volatile memory 35 is connected to microcomputer 26 as the means of storage. Microcomputer 26 is composed to store the result of the discrimination performed in the above manner, that is to say whether it is sink input or source input, in non-volatile memory 35. Moreover, microcomputer 26 is composed both to read out the discrimination result discriminated at the time of previous operation, which is stored in non-volatile memory 35, and to compare that with the discrimination result at the current time of operation discriminated in the manner described above. In this case, microcomputer 26 functions as the means of comparison of the present invention.

Microcomputer 26 is so composed that, when it has judged by the above comparison process that the discrimination result of the previous time of operation and the discrimination result of the current time of operation differ, it informs of that difference. For example, it may display that information on a display device (not illustrated) provided on an operating panel. In the case of this composition, the means of information of the present invention is composed by microcomputer 26 and the display device. Thus, the user may accurately check that the input method has changed between the previous time of operation and the current time of operation. Therefore, in the unlikely case of the setting of the input method being erroneous, that fact may readily be checked and thus the utmost may be done to prevent the occurrence of incorrect operation.

When using this embodiment composed as above, in the case of sink input being inputted at input terminal 22, contacts (c–a) are made by the manual operation of changeover switch 24, and pull-up resistor 23 is put into the connection state of being connected to input terminal 22. Therefore it is made possible to execute sink input. On the other hand, in the case of source input being inputted, contacts (c–b) are made by the manual operation of changeover switch 24, and pull-down resistor 23 is put into the connection state of being connected to input terminal 22. Therefore, the execution of source input is enabled.

Also, in the case of this embodiment, judgement is made as to whether it is sink input or source input through the discrimination of the switching state of changeover switch 24 by microcomputer 26. At the same time, the composition is designed to switch between a signal output state that outputs the inverted signal of input signal Si as logic signal Sa, and a signal output state that outputs input signal Si as it stands as logic signal Sa, based on the result of the above discrimination by microcomputer 26. By this means, the input circuit of the above embodiment has a composition capable of response to either sink input or source input.

Moreover, in the case of the above embodiment, changeover switch 24 is a low-cost composition as the means of switching. Also, the means of judgement is a circuit that detects whether the voltage level of a terminal (in practice, common contact c of changeover switch 24) is high level or low level. In the above embodiment this is achieved by voltage level conversion circuit 27 of simple composition and a control function (software) of microcomputer 26. That is to say, the means of judgement may be achieved by a low-cost composition. Furthermore, the means of signal switching is achieved by a control function (software) of microcomputer 26, and is therefore of low-cost composition. Consequently, the input circuit of the above embodiment may reduce production costs in comparison with the prior art composition (see FIG. 1).

Figure 6:
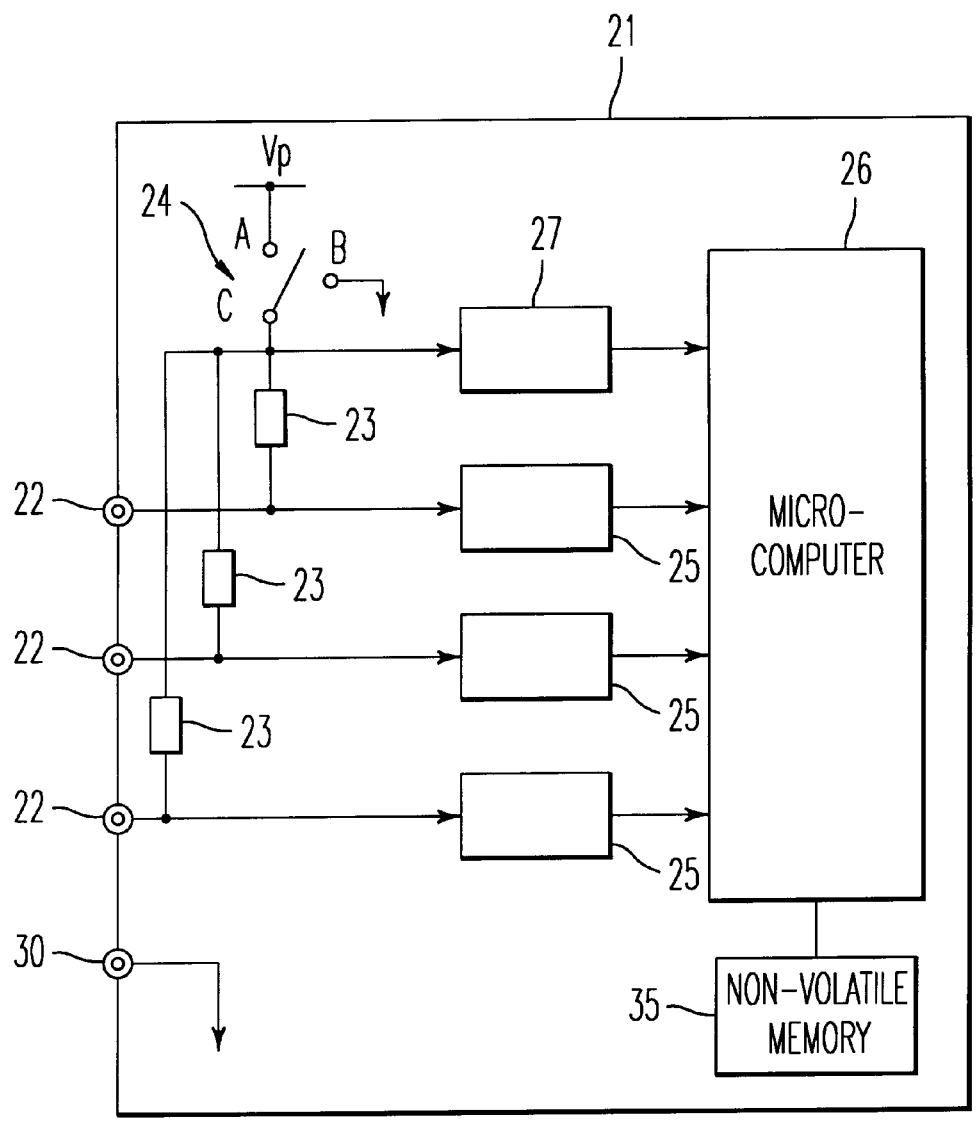
FIG. 6 is a drawing equivalent to FIG. 2 showing a composition that provides three input terminals.

In particular, with the composition of the above embodiment, in the case of being composed to provide a number of input terminals 22, production cost may be greatly reduced in comparison with the prior art composition. As a practical illustration of this, a composition that provides three input terminals 22 is shown in FIG. 6. As shown in FIG. 6, even though three input terminals are provided, the composition manages with the provision of only one each of changeover switch 24 and voltage level conversion circuit 27. Also, although the number of means of signal switching required is the same as the number of input terminals, these are achieved by control functions (software) of microcomputer 26. Thus, a low-cost composition may be achieved. The number of resistors 23 for pull-up or pull-down use and the number voltage level conversion circuits 25 are respectively increased to equal the number (three) of input terminals. However, in both sink input-dedicated input circuits and source input-dedicated input circuits, these parts are parts which must of necessity be increased in number when a number of input terminals are provided. Consequently, when using this embodiment, even when a number of input terminals are provided, it is possible to reduce production costs.

As opposed to this, in the prior art composition (see FIG. 1) if a number of input terminals are provided, a circuit composed of four diodes and a photocoupler must be provided for each separate input terminal. Consequently, with the prior art composition, if a number of input terminals are provided, the production cost greatly increases. Thus, the greater the number of input terminals provided, the greater becomes the difference in production costs between the above embodiment and the prior art composition.

With the above embodiment, voltage level conversion circuit 27 has been composed as the circuit shown in FIG. 3. However, the present invention is not limited to this, and other circuit compositions may be used, provided they are circuits that may convert voltage level. Also, voltage level conversion circuit 25 has been composed as the circuit shown in FIG. 4. However, the present invention is not limited to this, and other circuit compositions (a circuit composed to use, for example, a photocoupler instead of the transistor) may be used, provided they are circuits that may convert voltage level.

Moreover, if input terminals 26a and 26b of microcomputer 26 are composed to be capable of directly inputting voltages of 24V, voltage level conversion circuits 25 and 27 may be rendered unnecessary. Furthermore, in the above embodiment, non-volatile memory 35 is provided as the storage means. However, the present invention is not limited to this, and a composition such as the installation of, for example, a memory (RAM) provided with a battery back-up function may be used.

Figure 7:
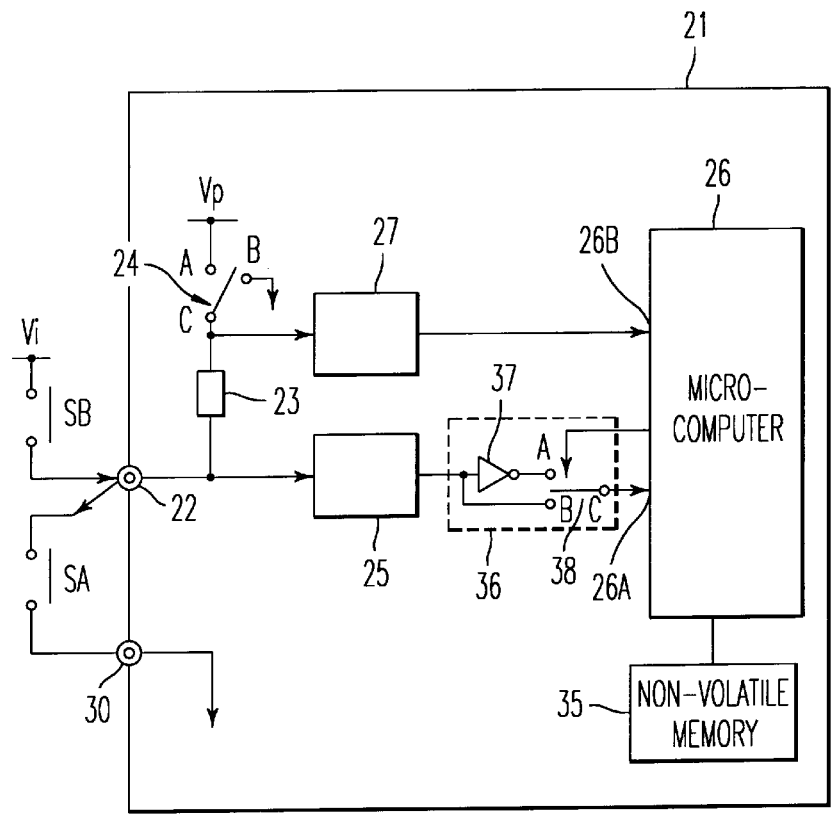
FIG. 7 is a drawing equivalent to FIG. 2 showing a second embodiment of the present invention.

Also, with the above embodiment, the means of signal switching is composed by a control function of microcomputer 26. However, instead of this the composition may be with a simple hardware circuit made up of a logic circuit and a changeover switch. In practice, as in a second embodiment shown in FIG. 7, it is desirable that signal switching circuit 36 be composed of inverter device 37 and changeover switch 38. In the case of this composition, the composition is to drive the switching of changeover switch 38 by microcomputer 26, while common contact c of changeover switch 38 is connected to input terminal 26a of microcomputer 26. Changeover switch 38 may be composed of, for example, the switching element of a transistor (semiconductor switch). Also, the output terminal of voltage level conversion circuit 25 is connected to inverter device 37 and one terminal b of changeover switch 38. Moreover, inverter device 37 is connected to the other terminal a of changeover switch 38.

In the case of the above composition, when microcomputer 26 makes contacts (c–a) of changeover switch 24 based on the voltage level of common contact c of changeover switch 24, that is to say in the case of sink input being discriminated, the composition operates changeover switch 38 so that its contacts (c–a) become made. On the other hand, when microcomputer 26 makes contacts (c–b), that is to say in the case of source input being discriminated, the composition operates changeover switch 38 so that its contacts (c–b) become made.

Apart from the above, the composition of the second embodiment is the same as the composition of the first embodiment. Consequently, the second embodiment may also obtain the same operational results as the first embodiment.

Figure 8:
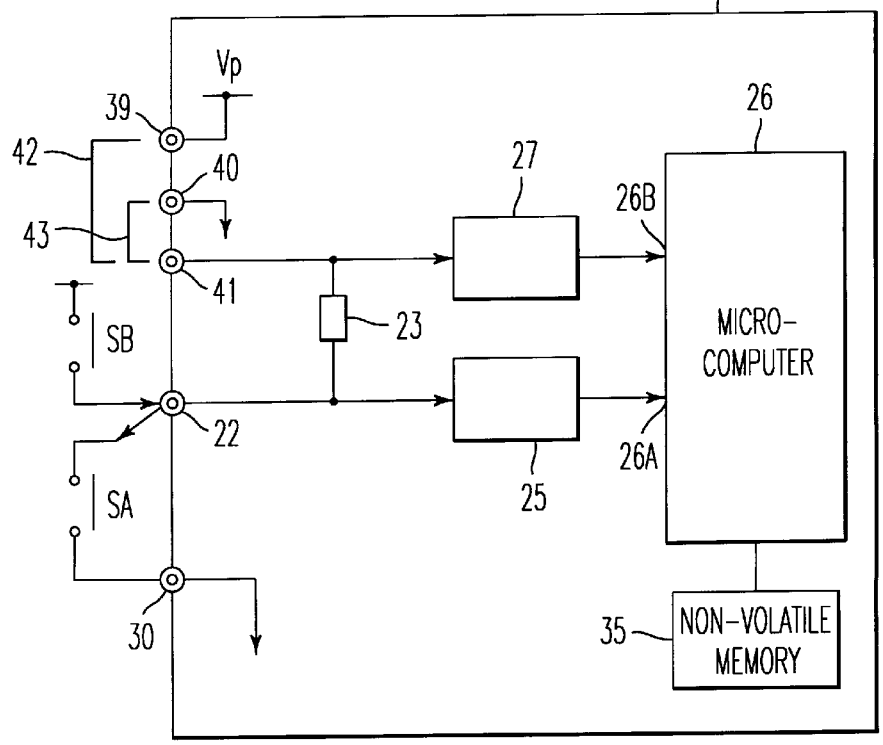
FIG. 8 is a drawing equivalent to FIG. 2 showing a third embodiment of the present invention.

FIG. 8 shows a third embodiment of the present invention. It illustrates the places of difference from the first embodiment. Like reference numerals are assigned to parts that are the same as in the first embodiment. In the third embodiment, the means of switching is composed of a terminal block having a plural of pin terminals, and connectors that are fitted on the pin terminals and short between specified pin terminals.

In practice, as shown in FIG. 8, terminal 39, which is connected to DC voltage terminal Vp, terminal 40, which is connected to earth, and terminal 41, which is connected to resistor 23 and voltage level conversion circuit 27, are provided as pin terminals on the terminal block (not illustrated) of (the control device) of an inverter device. Also provided are connectors 42 and 43, which are fitted on these pin terminals.

With this composition, in the case of executing sink input, it is composed to short between terminal 39 and terminal 40 using connector 42, by fitting connector 42 on terminal 39 and terminal 40. On the other hand, in the case of executing source input, it is composed to short between terminal 40 and terminal 41 using connector 43, by fitting connector 43 on terminal 40 and terminal 41.

Microcomputer 26 is composed to discriminate whether there is shorting between terminal 39 and terminal 40 (that is to say whether it is sink input) or whether there is shorting between terminal 40 and terminal 41 (that is to say whether it is source input) by detecting the voltage level of terminal 41 via voltage level conversion circuit 27. Apart from the above, the composition of the third embodiment is the same as that of the first embodiment. Consequently, the third embodiment may also obtain virtually the same operational results as the first embodiment.

Also, in the third embodiment the means of switching is composed by a plural of pin terminals and connectors. However, instead of this, it may be composed by a plural of lands provided on a printed circuit board and inserting and soldering jumper lines that short between specified lands in pin insertion holes formed in these lands. In the case of this type of composition also, virtually the same operational results may be obtained as with the third embodiment.

Figure 9:
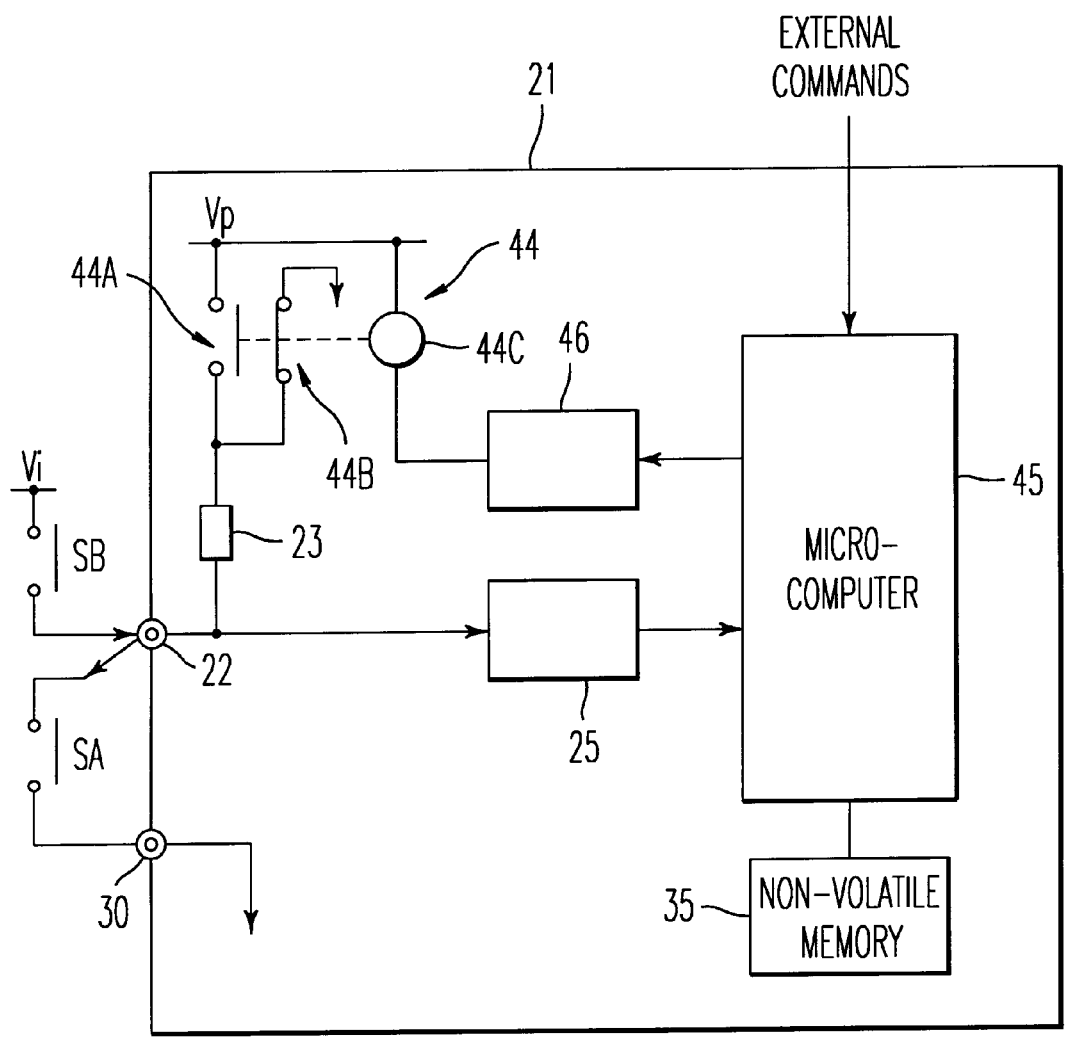
FIG. 9 is a drawing equivalent to FIG. 2 showing a fourth embodiment of the present invention.

FIG. 9 shows a fourth embodiment of the present invention. It illustrates the places of difference from the first embodiment. Like reference numerals are assigned to parts that are the same as in the first embodiment. In the fourth embodiment, the means of switching is composed by a switching device made up of components such as relays or transistors. At the same time, the composition provides a means of switching control that controls the switching of the switching device based on external commands.

In practice, as shown in FIG. 9, the means of switching is composed of relay 44, which is made up of contacts 44a and 44b of two interlocking relays and relay coil 44c. In this case, contacts 44a of one relay are connected between DC voltage terminal Vp and resistor 23, and contacts 44b of the other relay are connected between resistor 23 and earth. Also, the composition is such that relay coil 44c is controlled by microcomputer 45 via driver circuit 46 to pass/not to pass current. The composition is such that external commands (that is to say commands that set sink input or source input) may be applied to microcomputer 45.

Here, as methods of applying external commands to microcomputer 45, there are such methods as the method of applying commands (for example, parameters) to microcomputer 45 based on the operation of various keys provided on an operator panel and the method of sending commands to microcomputer 45 via a transmission line from an external terminal, such as a personal computer.

In the case of the above composition, when an external command is applied to microcomputer 45, microcomputer 45 drives and controls relay 44 based on that command. In practice, in the case of the command being the setting of sink output, microcomputer 45 makes relay contacts 44a (and also breaks relay contacts 44b) by making relay coil 44c conductive. In the case of the command being, on the contrary, the setting of source input, microcomputer 45 makes relay contacts 44b (and also breaks relay contacts 44a) by making relay coil 44c non-conductive. At the same time, microcomputer 45 is composed to store the above inputted commands in non-volatile memory 35.

Apart from the above, the composition of the fourth embodiment is the same as that of the first embodiment. Consequently, the fourth embodiment may also obtain virtually the same operational results as the first embodiment. In particular, with the above fourth embodiment, the execution of switching to sink input or source input using external commands is simple.

Also, with the above fourth embodiment, self-diagnosis of the interface circuit (the input circuit) is possible in the following manner. With input terminal 22 in the open state, relay contacts 44a and 44b are made and broken by making and breaking relay coil 44c using microcomputer 45. Then, whether the signal applied from input terminal 22, that is to say the signal outputted from voltage level conversion circuit 25, is inverted or not is judged at this time using microcomputer 45.

In the case of this composition, when it is detected that the signal outputted from voltage level conversion circuit 25 is inverted, it may be decided that the operations of voltage level conversion circuit 25 and relay 44 of the input circuit are normal. On the other hand, when it is detected that the signal outputted from voltage level conversion circuit 25 is not inverted, it may be decided that the operation of one or other of voltage level conversion circuit 25 and relay 44 of the input circuit is abnormal. That is to say, with the above composition, microcomputer 45 composes the means of self-diagnosis of the present invention.

Figure 10:
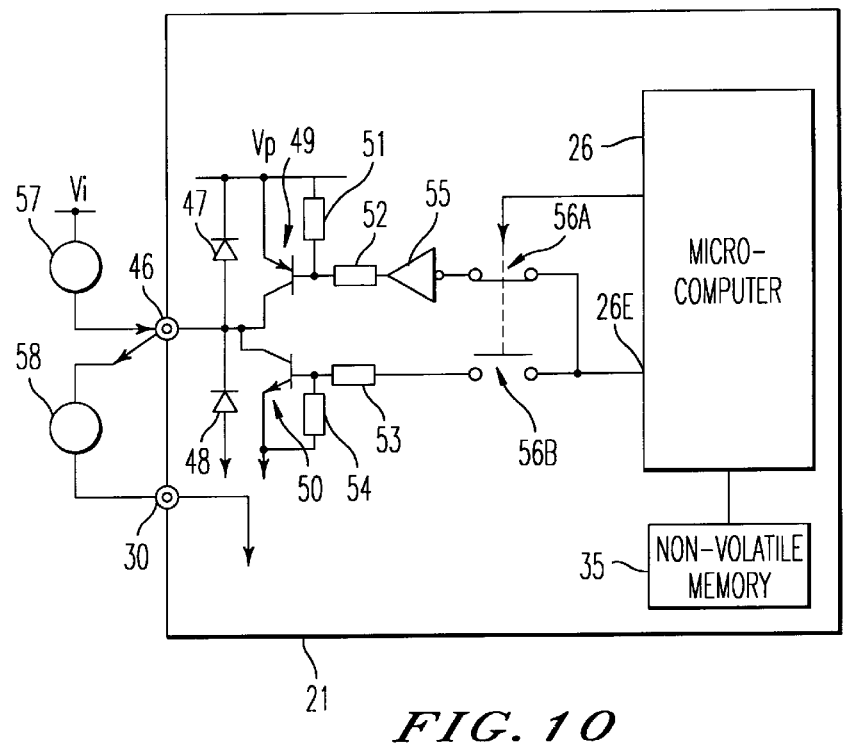
FIG. 10 is an electrical circuit diagram of an output circuit and its environs showing a fifth embodiment of the present invention.

FIG. 10 shows a fifth embodiment of the present invention. It illustrates the places of difference from the first embodiment. Like reference numerals are assigned to parts that are the same as in the first embodiment. The fifth embodiment is composed automatically to switch between an output method that outputs an output signal using sink output and an output method that outputs using source output, based on the discrimination result of whether it is sink input or source input.

The following is a practical description following FIG. 10. FIG. 10 is an electrical circuit diagram showing an output circuit and its environs. In FIG. 10, diodes 47 and 48, PNP type transistor 49, NPN type transistor 50 and resistors 51~54 are connected to output terminal 46 as shown in the drawing. Also, the base of transistor 49 is connected to first switch 56a via resistor 52 and inverter device 55. The base of transistor 50 is connected to second switch 56b via resistor 53. Moreover, first switch 56a and second switch 56b are connected to output terminal 26e of microcomputer 26.

Also, microcomputer 26 is composed so that it controls the ON/OFF switching of first switch 56a and second switch 56b. In this case, microcomputer 26 breaks first switch 56a and makes second switch 56b when it has discriminated, in the above-mentioned manner, that there is a sink input. By this means, it becomes possible to output from output terminal 46 by the sink output method. In this case, the composition is such that the load, which is for example relay coil 57, is connected between DC voltage terminal Vi and output terminal 46.

On the other hand, microcomputer 26 makes first switch 56a and breaks second switch 56b when it has discriminated, in the above-mentioned manner, that there is a source input. By this means, it becomes possible to output from output terminal 46 by the source output method. In this case, the composition is such that the load, which is for example relay coil 58, is connected between output terminal 46 and common earth terminal 30. In the case of this composition, the means of output method switching of the present invention is composed by first switch 56a, second switch 56b and microcomputer 26.

Apart from the above, the composition of the fifth embodiment (the composition of the input circuit, and the like) is the same as that of the first embodiment. Consequently, the fifth embodiment may also obtain virtually the same operational results as the first embodiment. In particular, with the above fifth embodiment, whether it is sink input or source input is discriminated by microcomputer 26. At the same time, the composition is such that it performs sink output when the discrimination result is sink input and the composition is also such that it performs source output when the discrimination result is source input. By this means, while it is a composition that is capable of switching input methods, it may also cause the output method to correspond to the input method that has been switched.

Figure 11:
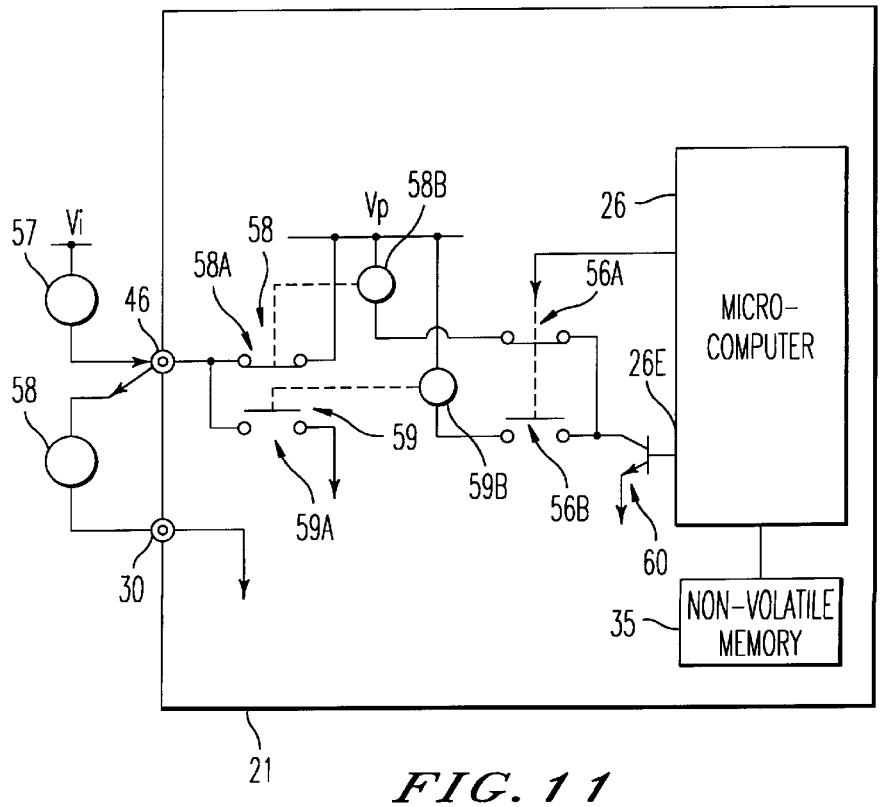
FIG. 11 is a drawing equivalent to FIG. 10 showing a sixth embodiment of this invention.

FIG. 11 shows a sixth embodiment of the present invention. It illustrates the places of difference from the first embodiment. Like reference numerals are assigned to parts that are the same as in the first embodiment. The sixth embodiment is a composition that automatically switches between an output method that outputs the output signal using the sink method and an output method that outputs the output signal using the source method, based on the discrimination result of whether it is sink input or source input. It may achieve this with an electrical circuit composition that differs from the above fifth embodiment.

In practice, as shown in FIG. 11, relay contacts 58a of relay 58 are connected between output terminal 46 and DC voltage terminal Vp, while relay contacts 59a of relay 59 are connected between output terminal and earth. Also, a series circuit made up of relay coil 58b of relay 58 and first switch 56a and a series circuit made up of relay coil 59b of relay 59 and second switch 56b are connected in parallel between DC voltage terminal Vp and the collector of NPN type transistor 60. Moreover, the emitter of transistor 60 is earthed, while the base is connected to output terminal 26e of microcomputer 26.

In the case of the sixth embodiment, microcomputer 26 breaks first switch 56a and makes second switch 56b when it has discriminated, in the above-mentioned manner, that it is a sink input. By this means, it becomes possible to output from output terminal 46 by the sink output method. In this case, the load, which is for example relay coil 57, is connected between DC voltage terminal Vi and output terminal 46.

On the other hand, microcomputer 26 makes first switch 56a and breaks second switch 56b when it has discriminated, in the above mentioned manner, that there is a source input. By this means, it becomes possible to output from output terminal 46 by the source output method. In this case, the load, which is for example relay coil 58, is connected between output terminal 46 and common earth terminal 30. Apart from the above, the composition of the sixth embodiment is the same as that of the fifth embodiment. Consequently, the sixth embodiment may also obtain virtually the same operational results as the fifth embodiment.

In the above various embodiments, the interface circuit of the present invention has been applied to the input circuits of control devices for inverter devices. However, it is not limited to this and it may be applied to the input circuits of other control devices.

As will be clear from the above description, the present invention is composed to provide:

a means of switching that switches between a connection state in which a pull-up resistor is connected to the input terminal and a connection state in which a pull-down resistor is connected to the input terminal;

a means of discrimination that discriminates whether it is sink input or source input by discriminating the switch connection state of this means of switching; and a means of signal switching that switches between a signal output state that outputs a signal that is an inversion of the said input signal and a signal output state that outputs the said input signal as it stands, based on the discrimination result of this discrimination means.

Thus it is a composition that may respond to either sink input or source input. Therefore, it will achieve the excellent effect of being able to reduce production costs.

Obviously, numerous modifications and variations of the present invention are possible in the light of the above teachings. It is therefore to be understood that within the scope of the appended claims, the present invention may be practiced otherwise than as specially described herein.

What is claimed as new and desired to be secured by Letters Patent of the United States is:

1. An interface circuit, comprising:
    a means for switching between a connection state in which a pull-up resistor is connected to an interface circuit input terminal and a connection state in which a pull-down resistor is connected to said interface circuit input terminal;
    a means for discriminating whether a sink input or source input is applied at said interface circuit input terminal by discriminating the connection state of the means for switching; and
    an output state switching means for switching between a first signal output state that outputs a first output signal that is an inversion relative to an input signal being input at the interface circuit input terminal and a second output signal in a second signal output state that outputs said input signal as it stands, said output state switching means switching between said first output signal state and said second output signal state in response to the discriminating result of said means for discriminating.

2. The interface circuit according to claim 1, wherein said means for discriminating includes a voltage detection portion for detecting voltage levels corresponding to respective connection states of said means for switching and said means for discriminating discriminates each respective connection state of said switching circuit based on the voltage detected by the voltage detection portion.

3. The interface circuit according to claim 1 or 2, wherein said means for switching comprises a manual switch.

4. The interface circuit according to claim 1 or 2, wherein said means for switching comprises a terminal block having a plurality of pin terminals and connectors that are fitted to said pin terminals so as to make connections between specified pin terminals.

5. The interface circuit according to claim 1 or 2, wherein said means for switching comprises a plurality of lands provided on a printed circuit board and jumper lines soldered to said lands so as to make connections between specified lands.

6. The interface circuit according to claim 1 or 2, wherein said means for switching comprises relays or transistors and a means for controlling switching of said relays or transistors in accordance with external commands.

7. The interface circuit according to claim 1 or 2, and further comprising:
    a processing device connected to receive the first output signal or the second output signal from the means for switching and providing a further signal to a second switching means, said second switching means switching between a sink output state and an source output state in response to the discriminating result of said means for discriminating.

8. The interface circuit according to claim 1 or 2, and further comprising:
    a storage means for storing the discriminating result output from said means for discriminating at a previous time of operation; and
    a comparison means for comparing said stored discriminating result with a second discriminating result provided by said means for discriminating at a current time of operation.

9. The interface circuit according to claim 8, and further comprising:
    a means responsive to said comparison means for indicating that an output of the comparison means when said stored discriminating result and said second discriminating result differ.

10. The interface circuit according to claim 6, and further comprising:
    a self-diagnosis means for performing self-diagnosis of the operation of said interface circuit by opening and closing said relays or transistors in a state in which said interface circuit input terminal is open while simultaneously judging whether or not the signal supplied from said interface circuit input terminal is inverted.

11. An interface circuit, comprising:
    a switching circuit configured to switch between a first connection state in which a pull-up resistor is connected to an interface circuit input terminal and a second connection state in which a pull-down resistor is connected to said interface circuit input terminal;
    a discrimination circuit configured to provide a discrimination result indicating whether a sink input or source input is present as an input signal at said interface circuit input terminal in response to a voltage detection circuit configured to detect voltages of levels corresponding to said first and second connection states of said switching circuit; and
    a signal switching circuit configured to respond to said discrimination circuit and to switch between a first signal output state that outputs a first signal that is an inversion of said input signal and a second signal output state that outputs said input signal as it stands as a second signal based on the discrimination result of said discrimination circuit.

* * * * *